United States Patent Office 3,261,868
Patented July 19, 1966

3,261,868
AMINOALKOXY-HYDROXYACETOPHENONES
Robert B. Moffett, Kalamazoo, Mich., assignor to The Upjohn Company, Kalamazoo, Mich., a corporation of Delaware
No Drawing. Filed Mar. 14, 1963, Ser. No. 265,048
5 Claims. (Cl. 260—570.7)

This invention pertains to novel organic chemical compounds, and is more particularly directed to novel amino-lower-alkoxy-2-hydroxyphenyl aldehydes and ketones which, in their free base forms, can be represented by the formula

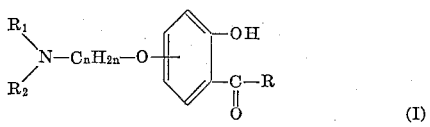

(I)

wherein R is selected from the group consisting of hydrogen, lower-alkyl of from 1 to 4 carbon atoms, inclusive, and phenyl; —$C_nH_{2n}$— is lower-alkylene; $n$ is an integer from 2 to 4, inclusive; and $R_1$ and $R_2$ taken separately are lower-alkyl, and taken together with —N< constitute a saturated heterocyclic amino radical

of from 5 to 7 nuclear atoms, inclusive, wherein Z is a saturated bivalent radical selected from the group consisting alkylene, oxadialkylene, thiadialkylene, and N-lower-alkylazadialkylene.

The novel free base compounds of Formula I form acid addition salts with acids, which acid addition salts are contemplated as an embodiment of the invention.

The novel free base and acid addition salt compounds of the invention are useful as enzyme inhibitors; for example, they inhibit monoamine oxidase and 5-hydroxytryptophan decarboxylase. The compounds can be used in their free base forms and as acid addition salts for stimulating the central nervous system of mammals, birds, and other animals. The compounds are also useful as ultraviolet screening agents and as optical brightening agents for textiles. The aminolower-alkoxysalicylaldehydes of this invention (compounds of Formula I wherein R is hydrogen) are also useful as intermediates for the preparation of amino-lower-alkoxy-3-(pyridyl)coumarins. The coumarins are central nervous system depressants, and are they prepared by condensing an amino-lower alkoxysalicyladehyde with a pyridineacetate of the formula

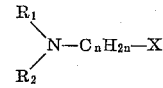

(II)

wherein "alkyl" is a lower-alkyl group, in the presence of a basic catalyst.

As employed herein, the term "lower-alkylene" means any branched or straight chain alkylene group of from 2 to 4 carbon atoms, inclusive, including for example, ethylene, trimethylene, butylene, dimethylethylene, and the like. The term "lower-alkyl" includes methyl, ethyl, propyl, butyl, and isomeric forms thereof. Similarly, the term, "saturated heterocyclic amino radical

of from 5 to 7 nuclear atoms, inclusive," includes pyrrolidino, 2-methylpyrrolidino, 2-ethylpyrrolidino, 2,2-dimethylpyrrolidino, 3,4-dimethylpyrrolidino, 2-isopropylpyrrolidino, 2-sec-butylpyrrolidino, and like alkylpyrrolidino groups, morpholino, 2-ethylmorpholino, 2-ethyl-5-methylmorpholino, 3,3-dimethylmorpholino, thiamorpholino, 3-methylthiamorpholino, 2,3,6-trimethylthiamorpholino, 4-methylpiperazino, 4-butylpiperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethylenimino, 2-methylhexamethylenimino, 3,6-dimethylhexamethylenimino, homomorpholino, and the like.

The novel aminolower-alkoxy-2-hydrophenyl aldehydes and ketones of the invention are prepared by alkylating a 3-, 4-, 5-, or 6-hydroxy-2-hydroxyphenyl aldehyde or ketone of the formula

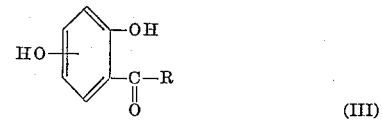

(III)

wherein R is as defined above, with an aminoalkyl chloride or bromide of the formula

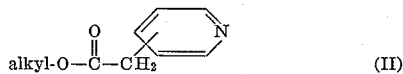

wherein $R_1$, $R_2$, —$C_nH_{2n}$—, and $n$ are as defined above, and X is chlorine or bromine. Representative aminoalkyl chlorides and bromides include 3-dimethylaminopropyl chloride, 2-dimethylaminoethyl brodime, 2-(1-hexamethylenimino)ethyl chloride, 2-(1-pyrrolidyl)ethyl chloride, and the like.

The alkylation is effected by including a strong base such as sodium carbonate, potassium carbonate, sodium methoxide, and like bases in the reaction mixture comprising an inert organic solvent. The aminoalkyl halide and the hydroxy-2-hydroxyphenyl aldehyde or ketone according to Formula III can be employed in stoichiometric (i.e., equimolar) proportions. Advantageously, however, the aminoalkyl halide is employed in excess, for example, about 1.5 moles of halide for each mole of hydroxy-2-hydroxyphenyl aldehyde or ketone up to about 2 moles of halide for each mole of hydroxy-2-hydroxyphenyl aldehyde or ketone. Suitable inert solvents for the reaction include acetone, methyl ethyl ketone, dioxane, and the like. The desired aminolower-alkoxy-2-hydroxyphenyl aldehyde or ketone product (compounds) of Formula I, above) are recovered by conventional procedures such as distillation, solvent extraction, crystallization, and the like.

Novel acid addition salts of the free base compounds of Formula I above are prepared by neutralizing the free base in an aqueous or non-aqueous medium with a desired acid, illustratively, a pharmacologically acceptable organic or inorganic acid, for example, hydrochloric, hydrobromic, sulfuric, phosphoric, tartaric, citric, acetic, succinic, pamoic, cyclo hexanesulfamic, and like acids. Salts of these and even toxic acids are used in purifying the free bases.

The free base compounds of Formula I can be reacted with fluosilicic acid to form fluosilicate salts in accordance with U.S. Patents 1,915,334 and 2,075,359. The amine fluosilicate salts thus otbained are effective as moth-proofing agents. The free base compounds also form salts with thiocyanic acid, which salts can be condensed with formaldehyde in accordance with U.S. Patents 2,425,320 and 2,606,155 to form amine thiocyanateformaldehyde condensation products for use as pickling inhibitors.

The following examples are illustrative of the process and products of the present invention, but are not to be construed as limiting.

EXAMPLE 1

*Preparation of 4-(3-dimethylaminopropoxy)salicylaldehyde and the hydrochloride thereof*

A mixture consisting of 41.5 g. (0.3 mole) of 4-hydroxysalicylaldehyde, 97 g. (0.7 mole) of potassium carbonate, 500 ml. of acetone, and 73 g. (0.6 mole) of 3-dimethylaminopropyl chloride was heated at the reflux temperature, with stirring, for 8 hrs. After setting aside the reaction mixture overnight, the acetone was removed by distillation and the residue thus obtained was dissolved in a mixture of about 1 liter of water and about 500 ml. of ether. The ether:water mixture was then acidified with dilute hydrochloric acid. The aqueous layer was separated, washed twice with ether, basified to about pH 8 with aqueous sodium hydroxide solution, and extracted first with ether and then with methylene chloride. The combined organic extracts were washed with water, and evaporated to dryness. There was thus obtained 24.8 g. of 4-(3-dimethylaminopropoxy)salicylaldehyde as a brown oil. On distillation, some of the compound apparently decomposed, but 1.6 g. of 4-(3-dimethylaminopropoxy)salicylaldehyde was obtained as a yellow liquid having a boiling point of 112° C. at 0.07 mm. of mercury pressure. The refractive index, $n_D^{25}$, was 1.5559. The infrared spectra of this distilled sample and the original oil were almost identical.

The distilled free base was dissolved in absolute ether and acidified with ethanolic hydrogen chloride. The 4-(3-dimethylaminopropoxy)salicylaldehyde hydrochloride separated as a nearly white solid having a melting point of 172° to 174° C. On recrystallization from isopropyl alcohol, 1.7 g. of the compound was obtained as white crystals having a melting point of 173.5° to 175° C.

*Analysis.*—Calcd. for $C_{12}H_{18}ClNO_3$: C, 55.49; H, 6.98; Cl, 13.66; N, 5.39. Found: C, 55.42; H, 6.87; Cl, 13.86; N, 5.26.

Following the same procedure but substituting 3-hydroxysalicylaldehyde, 5-hydroxysalicylaldehyde, and 6-hydroxysalicylaldehyde for 4-hydroxysalicylaldehyde, there can be prepared 3-(3-dimethylaminopropoxy)salicylaldehyde, 5-(3-dimethylaminopropoxy)salicylaldehyde, and 6-(3-dimethylaminopropoxy)salicylaldehyde, respectively.

Likewise following the same procedure, but substituting 2-(di-n-butylamino)ethyl chloride,
2-dimethylaminoethyl chloride,
4-dimethylaminobutyl chloride,
2-(1-pyrrolidyl)ethyl chloride,
2-[1-(2,2-dimethylpyrrolidyl)]ethyl chloride,
3-[1-(4-methylpiperazyl)]propyl chloride,
2-(1-piperidyl)ethyl chloride,
2-[1-(4-propylpiperidyl)]ethyl chloride,
2-(1-hexamethylenimino)ethyl chloride,
2-[1-(2-methylhexamethylenimino)]ethyl chloride,
2-(4-morpholyl)ethyl chloride,
2-[4-(2-methylmorpholyl)]ethyl chloride, and
2-(4-thiamorpholyl)ethyl chloride for 3-dimethylaminopropyl chloride, there can be prepared
4-[2-(di-n-butylamino)ethoxy]-,
4-(2-dimethylaminoethoxy)-,
4-(4-dimethylaminobutoxy)-,
4-[2-(1-pyrrolidyl)ethoxy]-,
4-{2-[1-(2,2-dimethylpyrrolidyl)]ethoxy}-,
4-{3-[1-(4-methylpiperazyl)]propoxy}-,
4-[2-(1-piperidyl)ethoxy]-,
4-{2-[1-(4-propylpiperidyl)]ethoxy}-,
4-[2-(1-hexamethylenimino)ethoxyl]-,
4-{2-[1-(2-methylhexamethylenimino)]ethoxy}-,
4-[2-(4-morpholyl)ethoxy],
4-{2-[4-(2-methylmorpholyl)]ethoxy}-, and
4-[2-(4-thiamorpholyl)ethoxy]salicylaldehydes,
respectively.

EXAMPLE 2

*Preparation of 4'-(2-diethylaminoethoxy)-2'-hydroxyacetophenone and the hydrochloride thereof*

A mixture consisting of 76.1 g. (0.5 mole) of 2',4'-dihydroxyacetophenone, 138.2 g. (1.0 mole) of potassium carbonate, 600 ml. of acetone, and 104 g. (0.75 mole) of 2-diethylaminoethyl chloride was heated at the reflux temperature with vigorous stirring for 5½ hrs. The reaction mixture was cooled and set aside for 5 days. The mixture was concentrated by distilling most of the solvent, and the residue was dissolved in a mixture, about 1 liter each, of ice water and ether. The ether layer was separated, extracted two times with 10% aqueous sodium hydroxide, dried over anhydrous potassium carbonate, and the ether was evaporated. There was thus obtained 17.4 g. of 4'-(2-diethylaminoethoxy) - 2' - hydroxyacetophenone as a nearly colorless oil. The original ice water layer was combined with the aqueous sodium hydroxide extracts of the ether layer, and the solution was acidified with hydrochloric acid. The acidified solution was extracted with ether, and then basified to about pH 8 with sodium bicarbonate. The alkaline solution was concentrated under reduced pressure on a steam bath, and the residue was extracted several times with methanol. The combined methanol extracts were evaporated to dryness, and the residue was triturated with methanol. After again evaporating the methanol, the residue was boiled with benzene, filtered, and the benzene was distilled. The crude 4'-(2-diethylaminoethoxy)-2'-hydroxyacetophenone thus obtained was combined with the first crop obtained above and distilled. There was thus obtained 72.2 g. (57.6% yield) of 4'-(2-diethylaminoethoxy) - 2' - hydroxyacetophenone as a nearly colorless oil having a boiling point of 115° C. at 0.01 mm. of mercury pressure. The refractive index, $n_D^{26}$, was 1.5398.

*Analysis.*—Calcd. for $C_{14}H_{21}NO_3$: C, 66.90; H, 8.42; N, 5.57; O, 19.10. Found: C, 66.64; H, 8.37; N, 5.42; O, 19.57.

4'-(2-diethylaminoethoxy) - 2' - hydroxyacetophenone hydrochloride was prepared by acidifying 10 g. of the free base in ether solution with ethanolic hydrogen chloride. The 4'-(2-diethylaminoethoxy)-2'-hydroxyacetophenone hydrochloride separated as a white crystalline solid having a melting point of 153° to 154.5° C. A sample recrystallized from methyl ethyl ketone had the same melting point.

*Analysis.*—Calcd. for $C_{14}H_{22}ClNO_3$: C, 58.42; H, 7.71; Cl, 12.32. Found: C, 58.35; H, 7.85; Cl, 12.44.

Following the same procedure but substituting, 4-dihydroxybenzophenone,
2,5-dihydroxybenzophenone,
2',4'-dihydroxypropiophenone,
2',5'-dihydroxypropiophenone,
2',3'-dihydroxypropiophenone,
2',5-dihydroxybutyrophenone,
2',4'-dihydroxybutyrophenone,
2',4'-dihydroxyvalerophenone, and
2',5'-dihydroxyvalerophenone for 2',4'-dihydroxyacetophenone there can be prepared
4-(2-diethylaminoethoxy)-2-hydroxybenzophenone,
5-(2-diethylaminoethoxy)-2-hydroxybenzophenone,
4'-(2-diethylamioethoxy)-2'-hydroxypropiophenone,
5'-(2-diethylaminoethoxy)-2'-hydroxypropionphenone,
3'-(2-diethylaminoethoxy)-2'-hydroxypropionphenone,
5'-(2-diethylaminoethoxy)-2'-hydroxybutyrophenone,
4'-(2-diethylaminoethoxy)-2'-hydroxybutyrophenone,
4'-(2-diethylaminoethoxy)-2'-hydroxyvalerophenone, and
5'-(2-diethylaminoethoxy)-2'-hydroxyvalerophenone,
respectively.

Likewise following the same procedure, but substituting
2-(di-n-butylamino)ethyl chloride,
2-dimethylaminoethyl chloride,
4-dimethylaminobutyl chloride,
2-(-pyrrolidyl)ethyl chloride,
2-[1-(2,2-dimethylpyrrolidyl)]ethyl chloride,
3-[1-(4-methylpiperazyl)]propyl chloride,
2-(1-piperidyl)ethyl chloride,
2-[1-(4-propylpiperidyl)]ethyl chloride,
2-(1-hexamethylenimino)ethyl chloride,
2-[1-(2-methylhexamethylenimino)]ethyl chloride,
2-(4-morpholyl)ethyl chloride,
2-[4-(2-methylmorpholyl)]ethyl chloride, and
2-(4-thiamorpholyl)ethyl chloride for
3-dimethylaminopropyl chloride, there can be prepared
4-[2-(di-n-butylamino)ethoxy]-,
4-(2-dimethylaminoethoxy)-,
4-(4-dimethylaminobutoxy)-,
4-[2-(1-pyrrolidyl)ethoxy]-,
4-{2-[1-(2,2-dimethylpyrrolidyl)]ethoxy}-,
4-{3-[1-(4-methylpiperazyl)]propoxy}-,
4-[2-(1-piperidyl)ethoxy]-,
4-{2-[1-(4-propylpiperidyl)]ethoxy}-,
4-{2-(1-hexamethylenimino)ethoxy]-,
4-{2-[1-(2-methylhexamethylenimino)]ethoxy}-,
4-[2-(4-morpholyl)ethoxy]-,
4-{2-[4-(2-methylmorpholyl)]ethoxy}-,
4-{2-[4-(2-methylmorpholyl)]ethoxy}-, and
4-[2-(4-thiamorpholyl)ethoxy]-2-hydroxyacetophenones,
respectively.

I claim:
1. A compound selected from the group consisting of (1) free base compounds of the formula

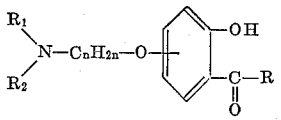

wherein R is selected from the group consisting of lower-alkyl and phenyl; —$C_nH_{2n}$— is lower-alkylene; $n$ is an integer from 2 to 4, inclusive; and $R_1$ and $R_2$ taken separately are lower-alkyl, and taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene; and (2) acid addition salts thereof.

2. Free base compounds of the formula

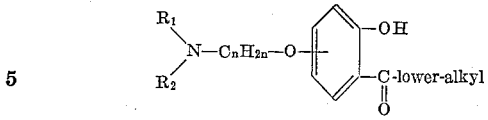

wherein —$C_nH_{2n}$— is lower-alkylene; $n$ is an integer from 2 to 4, inclusive; and $R_1$ and $R_2$ taken separately are lower-alkyl, and taken together with —N< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

3. Acid addition salts of free base compounds of the formula

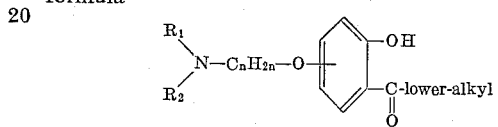

wherein —$C_nH_{2n}$— is lower-alkylene; $n$ is an integer from 2 to 4, inclusive; and $R_1$ and $R_2$ taken separately are lower-alkyl, and taken together with —< constitute a saturated heterocyclic amino radical

of from 5 to 7 nuclear atoms, inclusive, wherein Z is a saturated bivalent radical selected from the group consisting of alkylene, oxadialkylene, thiadialkylene, and N-lower-alkylazadialkylene.

4. 4'-(2-diethylaminoethoxy)-2'-hydroxyacetophenone.
5. 4'-(2-diethylaminoethoxy)-2'-hydroxyacetophenone hydrochloride.

References Cited by the Examiner

UNITED STATES PATENTS

| | | | |
|---|---|---|---|
| 1,894,865 | 1/1933 | Hartmann et al. | 260—570.7 |
| 2,599,000 | 6/1952 | Kerwin et al. | 260—570.7 |
| 2,921,961 | 1/1960 | Muller et al. | 260—570.7 |

FOREIGN PATENTS 872,997  7/1961  Great Britain.

OTHER REFERENCES

Kratzl et al., "Monatsh. Chem.," vol. 88, pages 1064–8 (1957).

CHARLES B. PARKER, *Primary Examiner.*
ROBERT V. HINES, *Assistant Examiner.*